United States Patent
Leinonen

(10) Patent No.: US 9,101,147 B2
(45) Date of Patent: Aug. 11, 2015

(54) METHOD AND DEVICE FOR CLEANING FISH

(75) Inventor: Mika Leinonen, Merimasku (FI)

(73) Assignee: Ricu-Tuotteet Oy, Merimasku (FI)

( * ) Notice: Subject to any disclaimer, the term of this patent is extended or adjusted under 35 U.S.C. 154(b) by 0 days.

(21) Appl. No.: 14/122,204

(22) PCT Filed: May 26, 2011

(86) PCT No.: PCT/FI2011/000029
§ 371 (c)(1),
(2), (4) Date: Feb. 14, 2014

(87) PCT Pub. No.: WO2012/160240
PCT Pub. Date: Nov. 29, 2012

(65) Prior Publication Data
US 2014/0187133 A1    Jul. 3, 2014

(51) Int. Cl.
A22C 21/02    (2006.01)
A22C 25/02    (2006.01)
A22C 25/00    (2006.01)
A22C 25/14    (2006.01)

(52) U.S. Cl.
CPC ............. A22C 25/025 (2013.01); A22C 25/006 (2013.01); A22C 25/14 (2013.01); A22C 25/145 (2013.01)

(58) Field of Classification Search
USPC .......................................... 452/102–104, 1–6
See application file for complete search history.

(56) References Cited

U.S. PATENT DOCUMENTS 1,475,301 A * 11/1923 Hartleb ............................ 30/161
1,920,954 A    8/1933 Benedict et al.
2,203,169 A *  6/1940 Lovgren ......................... 452/103
2,206,257 A *  7/1940 Kah .................................. 30/142
2,364,333 A   12/1944 Wisher
2,630,314 A *  3/1953 Cadwallader .................. 177/129
3,290,720 A   12/1966 Gordon
3,414,935 A * 12/1968 Senna ............................ 452/103
3,748,742 A    7/1973 Bigler et al. .................... 30/294
3,771,197 A * 11/1973 Heuer, Sr. ..................... 452/103
4,149,296 A *  4/1979 Stanford ........................ 452/103
4,759,126 A *  7/1988 McCoy et al. ............... 30/120.1
6,450,871 B1 * 9/2002 Morrison et al. ................. 452/6
6,607,430 B1 * 8/2003 Navarette ...................... 452/105
7,402,099 B1 * 7/2008 Parvin .......................... 452/103
7,487,565 B1 * 2/2009 Sundling et al. .................. 7/158
2005/0009460 A1  1/2005 Weaver .......................... 452/105
2005/0044726 A1  3/2005 Summers et al. ............... 30/294

FOREIGN PATENT DOCUMENTS

| CN | 2121816 U | 11/1992 |
|---|---|---|
| DE | 613693 C | 11/1935 |
| EP | 1970172 A1 | 9/2008 |
| GB | 416366 A | 9/1934 |
| WO | 2004/071250 A2 | 8/2004 |

* cited by examiner

Primary Examiner — Richard Price, Jr.
(74) Attorney, Agent, or Firm — Kubovcik & Kubovcik

(57) ABSTRACT

Method and device for cleaning fish in successive work steps with the one and the same cleaning device (10) combining a scaling member (20), a blade (40) for opening the fish's belly and an entrail removal member (30). The scaling of the fish is performed with the embossed scaling member (20) of the cleaning device, after which the blade (40) of the cleaning device is exposed and the fish's belly is opened. After that, the blade of the cleaning device is turned so that it is not exposed and the fish's entrails are removed with the spoon-like entrail removal member (30) of the cleaning device.

2 Claims, 8 Drawing Sheets

METHOD AND DEVICE FOR CLEANING FISH

OBJECT OF THE INVENTION

The object of the invention is a method and device for cleaning fish.

PRIOR ART

According to a known method, the steps involved in cleaning a fish usually include scaling, i.e. removal of the scales of the fish, opening the fish and removal of the guts. After that, the fish is ready to be sautéed or boiled. However, larger fish can also be filleted or cut into pieces first.

There are however many situations in the various steps of cleaning a fish that can go wrong or the cleaner can even hurt himself. Problems may arise from not performing the cleaning steps correctly or from using cleaning tools that are not suitable for the purpose.

Usually fish scaling, i.e. the removal of scales, is performed by moving a scaler or the blade of a knife crosswise over the scales of the fish. As often only a knife is available, it is usually used for scaling. When scaling with a knife, some force is required, which makes it somewhat dangerous. The knife can easily slip and cut the cleaner's hand.

Once the scales have been removed, the next step in cleaning the fish is to open the fish's belly. As the fish's belly needs to be cut open, this work step is also usually performed using a knife. The opening of the fish's belly with a knife is done by inserting the knife point under the fish's belly skin, either where the gills are located or near the fish's tail. After that, the knife is moved under the fish's belly skin from the gills towards the fish's tail or in the opposite direction so that the knife blade cuts the fish's belly open from the inside. This must, however, be done very carefully in order not to puncture the fish's bowels or other entrails.

Also in this fish cleaning step where the fish's belly is opened, many mistakes or even damage can easily occur. Therefore it must be done cautiously and carefully. As the fish's belly skin can be tough, the knife to be used must be sharp, and even then the cutting sometimes still requires quite a bit of force. At this stage, the knife can slip and the fish cleaner can easily hurt himself. Even if everything goes well otherwise, the fish cleaner can also make the mistake of pushing the knife point too deep into the fish's belly. As a consequence of this, the fish's bowels and other entrails can become damaged, in which case the harmful liquids that they contain will easily spoil the flesh of the fish.

Once the fish's belly has been opened, the fish's entrails must also be removed with care so that they are not punctured during this step either. However, if the entrails are firmly attached inside the fish, the cleaner is greatly tempted to use a knife for this step too, because usually no other more suitable tools are available. In that case, it is still highly possible that the bowels and other entrails of the fish will become damaged.

From what has been presented above, it becomes clear that the known fish cleaning method provides many opportunities to make mistakes or use the wrong tools. As a result of these, the cleaning of the fish can fail or the cleaner can hurt himself.

PURPOSE OF THE INVENTION

The purpose of this invention is to create a method and a device overcoming the above-mentioned drawbacks. Furthermore, the purpose of the invention is to create a device that makes it possible to perform the cleaning of the fish more easily and better and so that its use does not cause any risk to the cleaner.

CHARACTERISTICS OF THE METHOD ACCORDING TO THE INVENTION

The method according to the invention is characterized in that, in the cleaning of a fish, the removal of the fish's scales, i.e. scaling, the opening of the fish's belly and the removal of the fish's entrails are performed in successive work steps using the same cleaning device which combines a scaling member, a blade for opening the fish's belly and an entrail removal member.

EMBODIMENTS OF THE METHOD ACCORDING TO THE INVENTION

A preferred embodiment of the method according to the invention is characterized in that the following steps are performed in fish cleaning:
- fish scaling is performed with the embossed scaling member of the cleaning device,
- the blade of the cleaning device is exposed and the fish's belly is opened, and
- the blade of the cleaning device is moved or turned so that it is not exposed and the fish's entrails are removed with the spoon-like entrail removal member of the cleaning device.

Another preferred embodiment of the method according to the invention is characterized in that the scaling of the fish, the opening of the belly and the removal of the entrails are performed in successive work steps so that, during all of the mentioned work steps, the cleaner essentially maintains the same grip on the cleaning device.

A third preferred embodiment of the method according to the invention is characterized in
- that, essentially during the whole cleaning operation, a right-handed cleaner holds the cleaning device with his right hand and a left-handed cleaner holds the cleaning device with his left hand, and
- that, with his other hand, the cleaner exposes the blade of the cleaning device and turns the blade away so that it is not exposed.

A fourth preferred embodiment of the method according to the invention is characterized in
- that the cleaner takes the cleaning device in his hand in such a way that the entrail removal member of the cleaning device faces the fish to be cleaned,
- that the cleaner performs the scaling of the fish by pressing the embossed scaling member of the cleaning device onto the fish's scales and by moving the scaling member back and forth over the fish's scales,
- that the cleaner exposes, with his other hand, the blade of the cleaning device and opens the fish's belly by pulling the cleaning device towards himself, and
- that the cleaner pushes the spoon-like entrail removal member of the cleaning device into the fish's belly and removes the fish's entrails by pushing the entrail removal member of the cleaning device away from himself.

CHARACTERISTICS OF THE DEVICE ACCORDING TO THE INVENTION

The device according to the invention for cleaning fish is characterized in that the fish cleaning device combines a fish scale removal member, i.e. a scaling member, a blade for opening the fish's belly and a fish entrail removal member, and that the blade of the cleaning device can be exposed for opening the fish's belly, and that the blade of the cleaning device can, after the fish's belly is opened, be moved or turned in such a way that it is not exposed.

EMBODIMENTS OF THE DEVICE ACCORDING TO THE INVENTION

A preferred embodiment of the device according to the invention is characterized in that the fish cleaning device includes a handle, which the fish cleaner grasps with his hand, an embossed scaling member below the handle so that the scaling member can be pressed against the scales of the fish to be cleaned, a spoon-like entrail removal member which is directed towards the fish to be cleaned, and a blade which can be turned, with the other hand, so that it is exposed for opening the fish's belly and which blade can correspondingly also be turned so that the blade is not exposed during the other cleaning steps.

Another preferred embodiment of the device according to the invention is characterized in that, in the fish cleaning device, the cutting edge of the blade meant for opening the fish's belly is curved and the blade is directed in the opposite direction to the spoon-like entrail removal member so that the opening of the fish's belly and the removal of the fish's entrails can be performed in opposite directions.

A third preferred embodiment of the device according to the invention is characterized in that, in the fish cleaning device, the blade has been attached to the body of the cleaning device by means of a shaft so that, in a first position, the blade is partially protected inside the body of the cleaning device and that in a second position, the blade is partially outside the body of the cleaning device, ready to be used for opening the fish's belly.

A fourth preferred embodiment of the device according to the invention is characterized in that the blade includes a locking member attached to the body of the cleaning device, such as a spring-loaded ball, which is pressed into the first locking hole or recess of the blade when the blade is locked in its first position, and that the ball is pressed into the second locking hole or recess of the blade when the blade is locked in its second position.

EXAMPLES OF EMBODIMENTS

In the following, the invention is described using examples with reference to the appended drawings, in which

LIST OF FIGURES

FIG. 1 is a side view of an embodiment of the fish cleaning device according to the invention.

FIG. 2 is a perspective view of the fish cleaning device of FIG. 1 seen obliquely from below.

FIG. 3 corresponds to FIG. 1 and shows a fish cleaning device, the blade of which has been turned outwards.

FIG. 4 is a perspective view of the fish cleaning device of FIG. 1 seen obliquely from above.

FIG. 5 is a partly sectional view of the fish cleaning device according to the invention with the blade turned inwards.

FIG. 6 is a partly sectional view of the fish cleaning device according to the invention with the blade turned outwards.

FIG. 7 is a perspective view of the blade of the fish cleaning device and the parts of its locking member.

FIG. 8 is a schematic sectional view of the body of the fish cleaning device and the blade locking member.

DESCRIPTION OF THE FIGURES

In the embodiment shown in FIG. 1, the body of the fish cleaning device 10 is essentially ring-shaped and has on top of it a handle 11, which the fish cleaner grasps with his hand. In the body of the fish cleaning device 10, on the underside, there is an embossed scaling member 20 which can be pressed against the scales of the fish to be cleaned. On the side of the fish cleaning device 10, there is a spoon-like entrail removal member 30. The fish cleaner grasps the handle 11 of the fish cleaning device 10 so that the entrail removal member 30 is directed towards the fish to be cleaned. In addition, the fish cleaning device 10 includes a blade 40 for opening the fish's belly.

FIG. 3 shows that the point 41 of the blade 40 is sharp so that it can easily be inserted under the fish's belly skin. In addition, the cutting edge 42 of the blade 40 is curved, whereby the blade, when pushed with the point 41 first, cuts the fish's belly skin well.

FIG. 5 also shows the two locking holes 44 and 45 located in the blade 40, which are attached to a locking member by means of which the blade 40 is locked into its various positions. When the blade 40 is in the position shown in FIG. 5, it is locked in place by means of the locking hole 44. The locking member and its functioning are described in more detail below. To put the blade 40 into the cutting position, the blade 40 is turned outwards by grasping it at the edge roughening 45.

In FIG. 8, the blade 40 is shown in a position where it has been turned outwards into the cutting position, in which the ball 52 has been pressed into the locking hole 45 located in the blade 40.

ADDITIONAL NOTES

Figure 1:
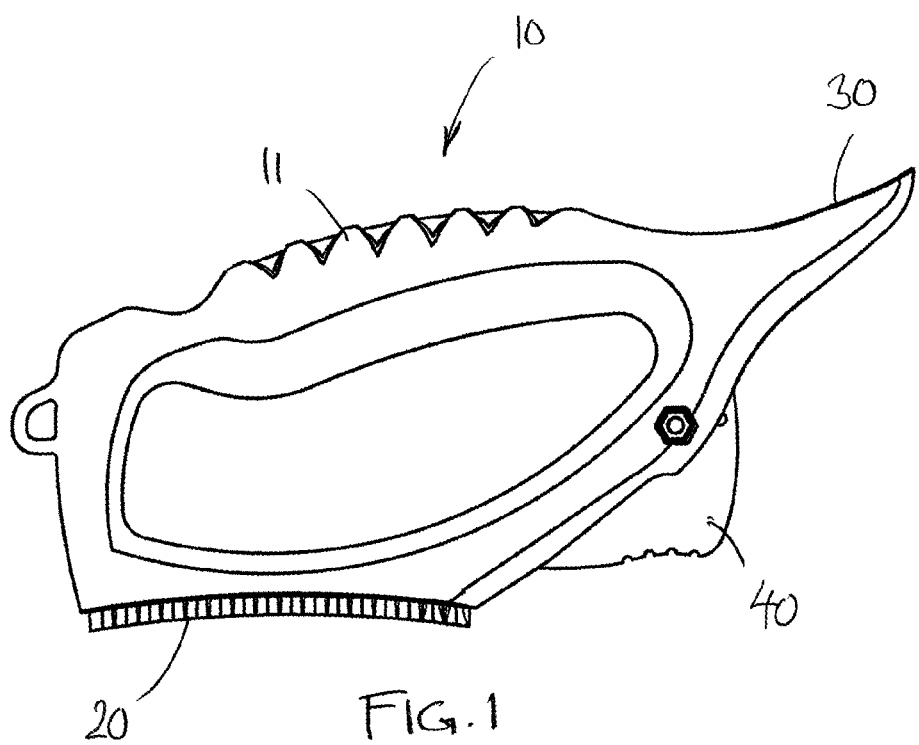
In FIG. 1, the blade 40 has been turned partially into the body. The body of the fish cleaning device 10 is most preferably of plastic and it can also be made from such a material that the fish cleaning device 10 floats on the surface of water.
Figure 2:
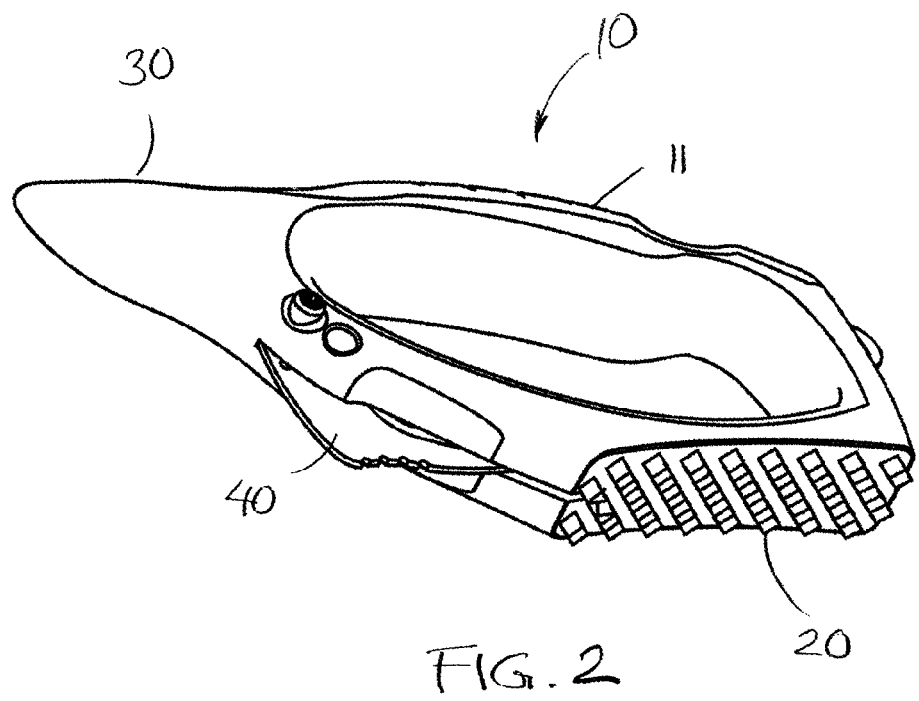
In FIG. 2, the fish cleaning device 10 is shown as a perspective view seen obliquely from below, whereby the embossed scaling member 20 meant for removing the fish's scales is well visible. When scaling, the scaling member 20 is pressed against the fish's scales and moved laterally back and forth.
Figure 3:
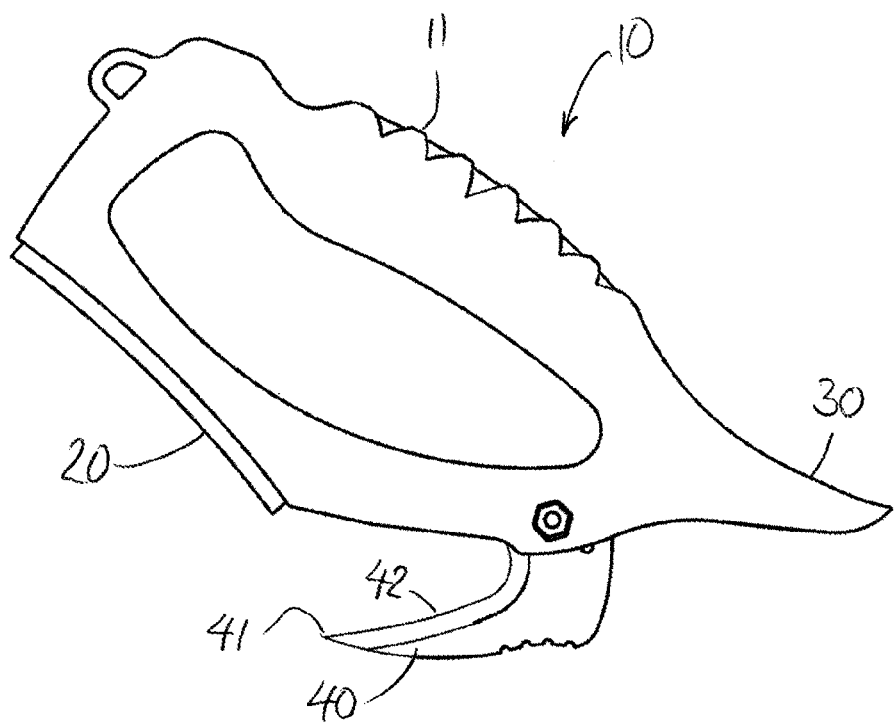
FIG. 3 shows the fish cleaning device 10 in a situation where the blade 40 has been turned outwards. The blade 40 can now be used for opening the fish's belly.
Figure 4:
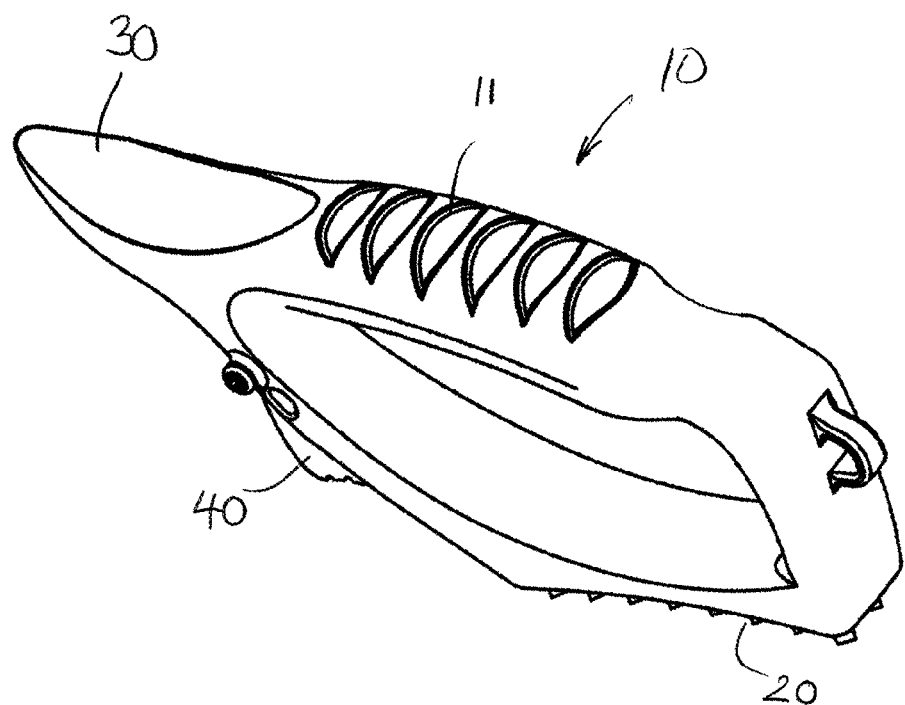
FIG. 4 shows, arranged as an extension of the handle 11 of the fish cleaning device 10, the spoon-like entrail removal member 30, which is used to remove the fish's entrails after the fish's belly has been cut open. Then the narrow and slightly rounded point section of the entrail removal member 30 is pushed into the fish's belly so that it detaches the bowels and other internal organs of the fish, which can then be removed from inside the fish. The point section of the removal member 30 is rounded in order not to puncture the fish's internal organs.
Figure 5:
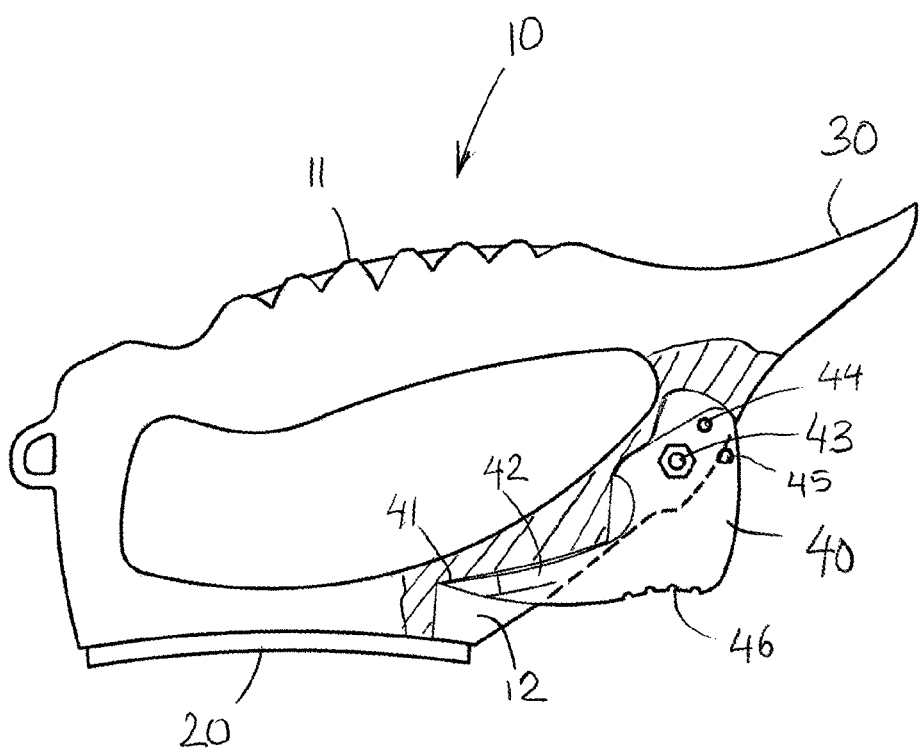
FIG. 5 shows a partially sectional view of the fish cleaning device 10, wherein the position of the blade 40 and the members attached to the blade 40 can be seen clearly. The blade 40 has been attached to the body of the fish cleaning device 10 by means of a shaft 43. Then the blade 40 can be turned around the shaft 43 so that its point 41 and cutting edge 42 go inside the cavity 12 inside the body.
Figure 6:
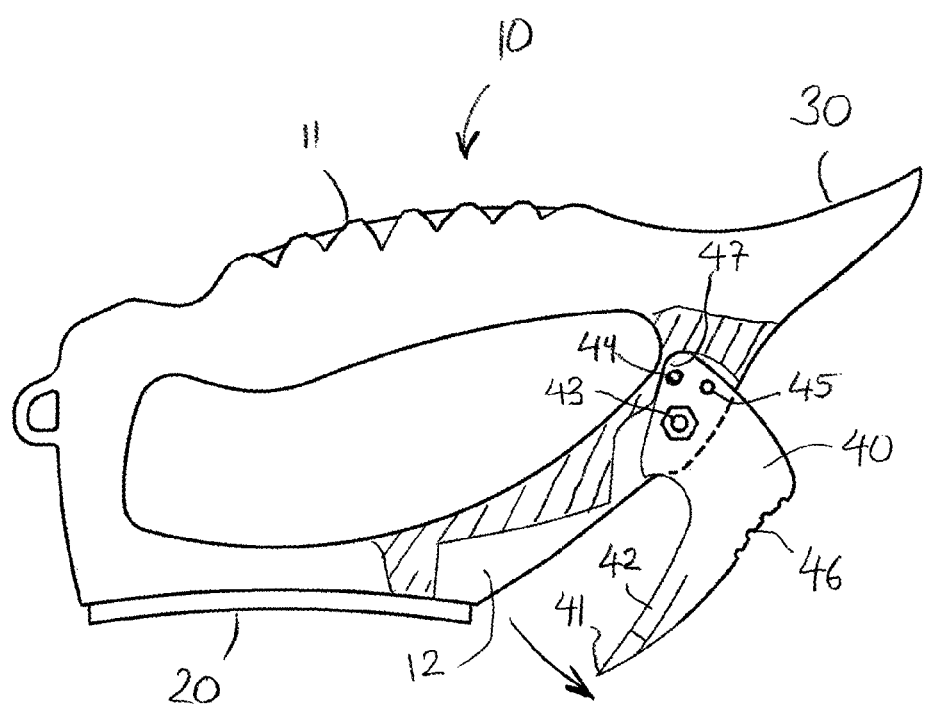
FIG. 6 also shows the fish cleaning device 10 as a partly sectional view when the blade 40 has been turned outwards. Then the blade 40 rests on the wall 47 of the cavity 12 of the body and is locked by means of the locking hole 45. This way the blade 40 stays firmly in place when the fish cleaning device 10 is pulled in FIG. 6 to the left and the curved cutting edge 42 of the blade 40 cuts the fish's belly open.
Figure 7:
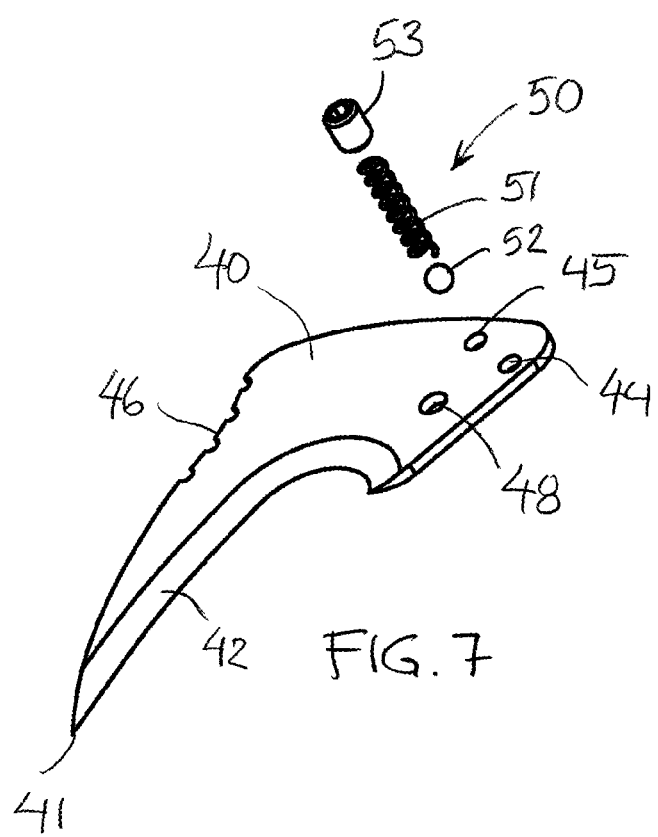
FIG. 7 shows a perspective view of the blade 40 of the fish cleaning device 10 and parts of its locking members 50. The blade 40 has a sharp point 41 and a curved cutting section 42. In addition, it has a shaft hole 48 and locking holes 44 and 45. The blade 40 is locked into its various positions so that a ball 52 loaded with a spring 51 is located in the body of the fish cleaning device 10, which are locked in place in the hole formed in the body with a plug 53. When turning the blade 40 around the shaft 43 shown in the previous figures, the ball 52 loaded with the spring 51 is pressed into one of the locking holes 44 or 45 of the blade 40 and locks the blade into its various positions.
Figure 8:
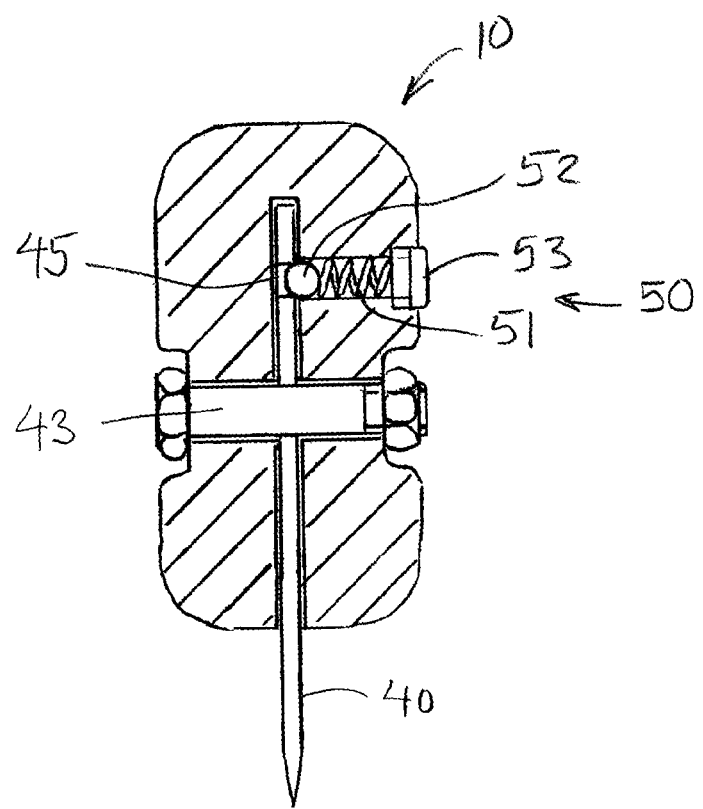
FIG. 8 shows a sectional view of the body of the fish cleaning device 10 and a schematic view of the blade locking member 50. The locking device 50 includes a spring 51 and a ball, which have been locked in place in the hole located in the body with the plug 53. When the blade 40 is turned, the ball 52 is pressed into one of the locking holes 44 or 45 located in the blade 40.

It is obvious to a person skilled in the art that the different embodiments of the invention may vary within the scope of the claims presented below.

LIST OF REFERENCE NUMBERS

10 Fish cleaning device
11 Handle
20 Scaling member
30 Entrail removal member
40 Blade
41 Point
42 Cutting edge
43 Shaft
44 Locking hole
45 Locking hole
46 Edge roughening
47 Wall
48 Shaft hole
50 Locking member
51 Spring
52 Ball
53 Plug

What is claimed is:

1. Fish cleaning device (10) having a body that is substantially ring-shaped and is made of a plastic that provides buoyancy to the body, said fish cleaning device (10) comprising:
   a handle (11) provided on the body and forming a top portion of the body, the handle having a front end and a back end and being capable of being grasped by a hand of a fish cleaner,
   an embossed scaling member (20) located on an underside of the body opposite the handle (11) and arranged to be pressed against the scales of a fish to be cleaned,
   a blade (40) attached to a bottom portion of the body by a shaft (43) located in the body opposite the front end of the handle, the blade (40) having a sharp point (41) and a curved cutting edge (42) and being pivotable on the shaft (43) from a first position in which the cutting edge (42) is located in a cavity (12) inside the body to a second position in which the cutting edge is exposed outside the body, such that when the blade (40) is in the second position the cleaner can open the belly of the fish by pulling the fish cleaning device (10) towards himself, and when the blade (40) is in the first position the cutting edge (42) is not exposed during other fish cleaning steps, and
   a spoon-like entrail removal member (30) arranged as an extension of the front end of the handle (11) of the fish cleaning device (10) and having a rounded point section, which spoon-like entrail removal member is directed towards the fish to be cleaned in a direction opposite to the blade (40) such that the cleaner can remove the entrails of the fish by pushing the entrail removal member away from himself, and thereby the opening of the belly of the fish and the removal of the entrails of the fish can be performed in opposite directions.

2. Fish cleaning device (10) according to claim 1, wherein the blade (40) is provided with a locking member (50) attached to the body of the cleaning device (10), the locking member including a ball (52) loaded with a spring (51), which ball is arranged and adapted to be pressed into a first locking hole (44) or recess of the blade when the blade is locked in its first position, and that the ball is pressed into a second locking hole (45) or recess of the blade (40) when the blade is locked in its second position.

* * * * *